United States Patent

[11] 3,588,537

[72] Inventor Robert E. Brink
Friendswood, Tex.

[21] Appl. No. 821,757
[22] Filed May 5, 1969
[45] Patented June 28, 1971

[73] Assignee Shell Oil Company
New York, N.Y.

[54] DIGITAL DIFFERENTIAL CIRCUIT MEANS
7 Claims, 7 Drawing Figs.

[52] U.S. Cl. ........ 307/235, 307/205, 307/251, 307/264, 307/304, 328/116, 328/135, 328/147, 328/172
[51] Int. Cl. ........ H03k 5/20
[50] Field of Search ........ 307/205, 268, 235, 246, 251, 264, 279, 304, 241, 243; 328/116, 135, 147, 151, 172, 173; 330/35, 38 (FE), 69; 324/103 (P)

[56] References Cited

UNITED STATES PATENTS

| | | | |
|---|---|---|---|
| 3,026,455 | 3/1962 | Smith | 330/69X |
| 3,275,996 | 9/1966 | Burns | 307/279X |
| 3,378,783 | 4/1968 | Gibson | 330/35 |
| 3,381,140 | 4/1968 | Walsh | 307/235 |
| 3,383,602 | 5/1968 | Herman | 328/147X |
| 3,395,292 | 7/1968 | Bogert | 307/221 |
| 3,502,905 | 3/1970 | Bicking | 307/235 |

*Primary Examiner*—Stanley T. Krawczewicz
*Attorneys*—Theodore E. Bieber and J. H. McCarthy

ABSTRACT: A field-effect transistor circuit for detecting and amplifying differential digital signals. The input to the circuit includes transistors that isolate the circuit from its external environment while the internal circuit is being initialized. Then on interrogation, cross-coupled asymmetrical FETs detect which of two input lines is furthest removed from ground potential. The circuit then supplies an output pulse or the absence thereof depending on which input line is furthest removed from ground.

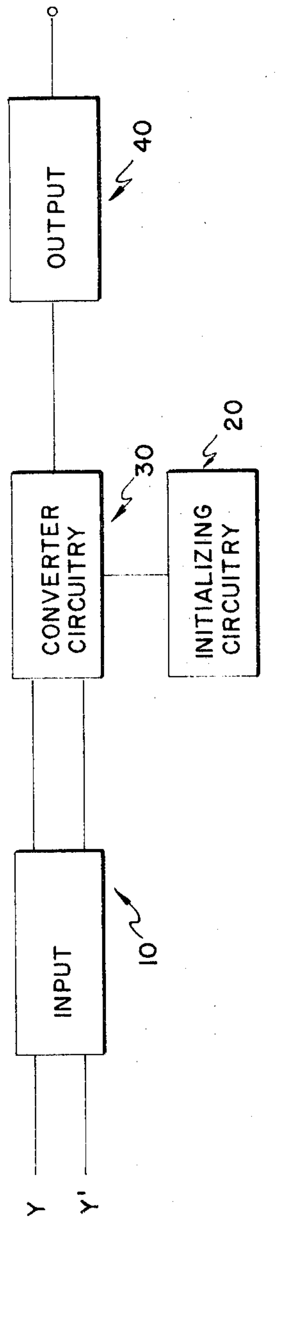
FIG. I
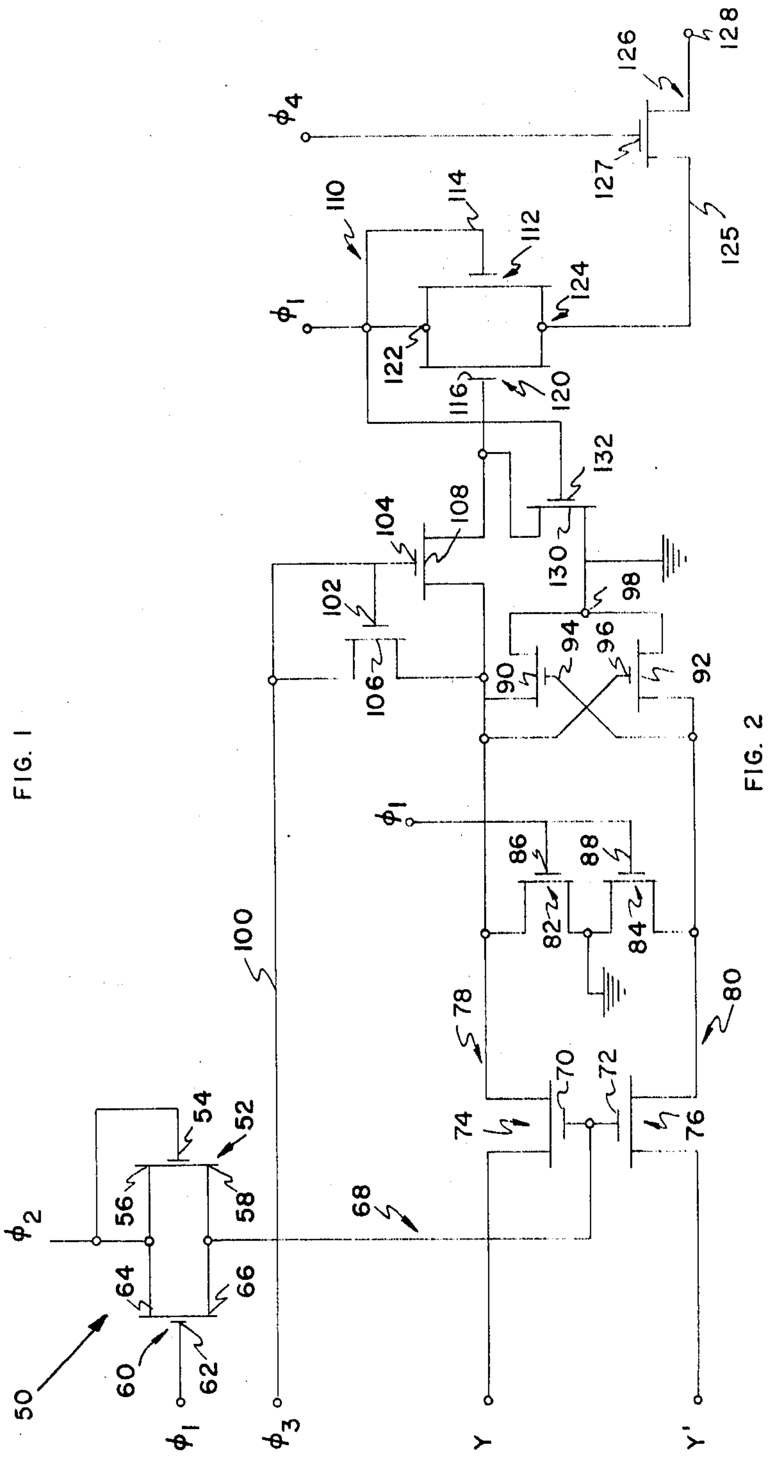
FIG. 2
INVENTOR:
R. E. BRINK
BY:
J. E. Buber
HIS ATTORNEY INVENTOR:
R. E. BRINK
BY:
J. E. Bieber
HIS ATTORNEY INVENTOR:
R. E. BRINK
BY:
J. E. Bisbee
HIS ATTORNEY INVENTOR:
R. E. BRINK
BY:
I. E. Bilber
HIS ATTORNEY

INVENTOR:
R. E. BRINK
BY:
HIS ATTORNEY

DIGITAL DIFFERENTIAL CIRCUIT MEANS

CROSS REFERENCE TO RELATED APPLICATION

The circuit described and claimed in this application is designed to operate in connection with the memory cell of copending application Ser. No. 821,755 (P-9347), filed May 5, 1969, and entitled Double-rail Random Access Memory Circuit for Integrated Circuit Devices.

BACKGROUND OF THE INVENTION

The invention relates to sensing and amplifying circuits for use in digital systems where the information may consist of a differential voltage. Digital systems use electrical signals consisting of a series of pulses for carrying out their operations. The existence of a pulse is often designated as a 1 in binary terminology and the absence of a pulse represents a 0. Digital circuits are able to manipulate the information contained in a series of pulses and perform useful, logical operations therefrom. But as can be seen circuits must be able to detect the absence or presence of a pulse before useful operations may be conducted. And it often happens that pulses do not have an ideal waveform and often have a relatively small amplitude. Furthermore pulses often appear in differential form. That is, pulses will consist of either a difference in amplitude or polarity between two signal-carrying lines. Thus circuits capable of detecting pulses with small amplitudes, irregular waveforms, or in differential form have a great utility in digital systems.

Also in connection with digital systems, it is useful to have detecting circuits capable of detecting when a voltage has exceeded a particular threshold and supplying an output in digital form.

Up until now, circuits capable of performing the above functions have been made using bipolar transistors. However a need exists for such circuits made in field-effect transistor technology. Now that FET's can be made economically and reliably, their unique advantages are being utilized to great advantage. For example the use of FET's as a technology base for making solid state memories is very promising. Compared with bipolar transistors, FET's take up very little space and consume very little power. Larger rays of FET memory cells are being integrated on a single chip of silicon. But the circuits used to sense signals from the memory cells have until now been bipolar. The disadvantages of bipolar sense circuits are first that the impedance and logic levels of bipolar and MOS transistors are substantially different and therefore special techniques are required to interconnect the two types of transistors. Secondly, it is impractical to form bipolar and MOS transistors on the same chip. Thus, sense amplifiers for memory circuits must be off the memory array chip which is often detrimental to system performance. Accordingly it is an object of this invention to provide a differential amplifier made entirely of field-effect transistors.

It is a further object of this invention to provide a sense amplifier that can be integrated on the same chip as a MOSFET memory array.

It is another objective of this invention to provide a level detector whereby a digital pulse is transmitted whenever an analog signal exceeds a predetermined voltage level.

Finally, it is an object of this invention to provide a waveshaping circuit whereby voltage differences transmitted down a pair of lines are detected and retransmitted as a pulse.

SUMMARY OF THE INVENTION

The above objects of the invention are achieved by a circuit herein briefly stated. The circuit must be disconnected from its input lines at all times except when it is called upon. To this end, an input circuit is provided that isolates the circuit except upon command. The isolating input means is necessary so that the remainder of the circuit can be internally initialized without the disturbing outside circuitry. A converter means is connected to the input means and is adapted, after initialization, to detect which of two input lines is closest to ground potential. The converter means then either does or does not generate an output pulse depending on which input line was closest to ground. An initialization means is connected to the converter means and is adapted to ground the converter means on a cyclical basis. Finally, an output means is connected to the converter means and acts primarily as an amplifier to supply a strong output pulse to whatever external circuitry may be connected to the circuit.

BRIEF DESCRIPTION OF THE DRAWING

The objects, features, and advantages of the circuit will be more readily understood from the following more particular description of preferred embodiments of the invention as illustrated in the accompanying drawing.

FIG. 1 is a block diagram showing the basic functional components of the invention and their interrelationship.

FIG. 2 is a detailed schematic diagram of a preferred embodiment of the invention.

DESCRIPTION OF PREFERRED EMBODIMENT

Figure 3:
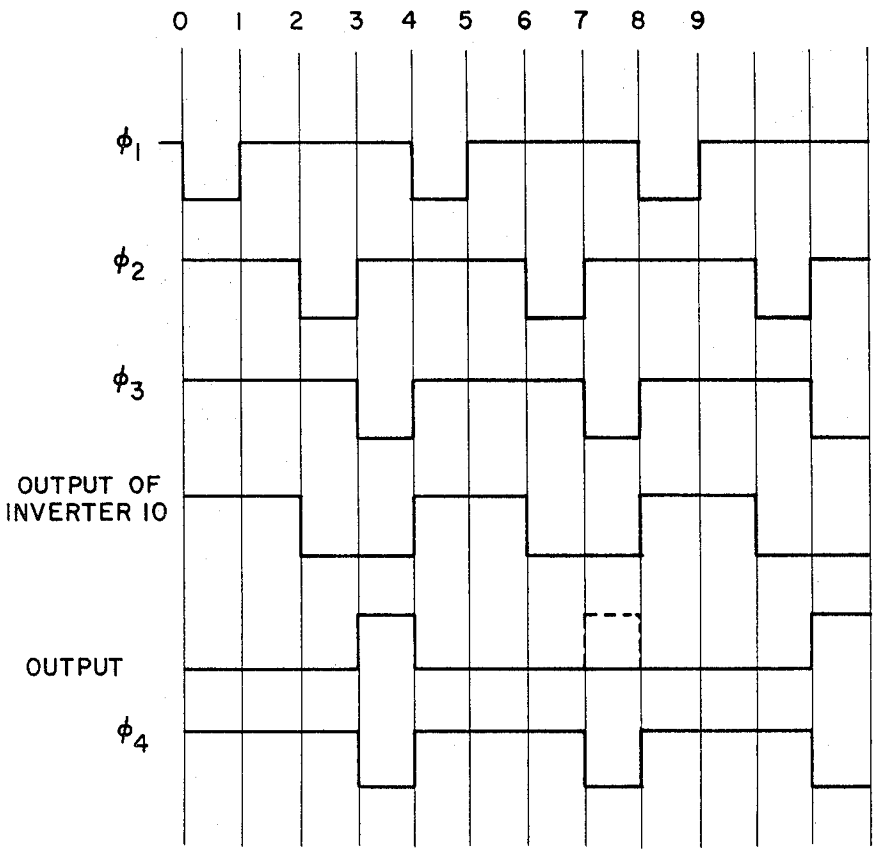
FIG. 3 is a timing chart showing the timing relationship among the various devices of FIG. 2.

Referring now to FIG. 1 there is shown an input means 10 having input lines Y and Y'. The Y and Y' lines may represent any circuit down which a signal is sent in the form of a differential voltage. Examples would be transmission lines, or as is specifically contemplated by this invention, a dual-rail memory cell. In the case of dual-rail memory cell, the voltage levels on the Y and Y' line would be 7.5 volts + 0.5 volts and 7 volts + 0.5 volts. Also connected to input means 10 are timing signals (not shown). The timing signals are cyclical and synchronous with respect to each other and cause input means 10 to cyclically isolate the Y and Y' input line from the remainder of the circuit.

Input means 10 is connected to converter means 30 which performs the function of converting the differential voltage existing between the Y and Y' line into either a pulse or the absence of a pulse. A timing pulse gates the converter to output stage 40.

An initializing means 20 is connected to converter means 30 and is synchronized with the rest of the circuit by timing pulses.

As will be explained in detail hereinafter, the initialization portion 20 operates to initialize the remainder of the circuit during the time that the Y and Y' lines are isolated. When a timing pulse is received, the initializing portion of the circuit 20 operates to ground the remainder of the circuit. It is important to have the circuit isolated during the reinitialization time since otherwise a short circuit to ground would be presented to the external circuitry. In the case of a sense amplifier for memory cells, the information in the memory cells would be destroyed.

Output means 40 performs an amplification and gating function. Typically, the pulse received from converter 30 requires amplification. In addition, it is often advantageous to present a high-current-delivering, low-impedance output stage to the rest of the world. Output stage 40 performs this function. Furthermore if the amplifier circuit is designed for an integrated circuit memory array, the system design may well demand an output gate. If such be the case then the output stage may perform this function.

The foregoing has been a discussion of the basic concepts underlining the present invention.

To better understand the detailed embodiment of the invention, it is helpful to have a basic understanding of field-effect transistors and how they are used to make electric circuits.

The term "transistors" refers to electronic components made out of semiconductor material and having the ability among other to amplify electric signals and act as a switch. The most common type of transistor, called bipolar because one end is electrically different from the other, has three terminals all of which make physical contact with the semiconductor material. On the other hand a field-effect transistor has two terminals in contact with the semiconductor material while the third terminal interacts with the semiconductor material across an insulator by means of an electric field (which accounts for the name).

Field-effect transistors can conveniently be broken down into the junction type and the insulated-gate type (IGFET). Of the IGFET type, the metal-oxide silicon field-effect transistor (MOSFET) is presently the most popular because it is the easiest to make. Since the present invention is concerned primarily with IGFET's, it will be explained with reference thereto, and specifically with reference to the MOSFET.

To understand how MOSFET circuits operate, it is valuable to understand the structure and operation of the actual MOSFET transistor.

To start with, all transistors are made out of a single crystal of some semiconductor material. The two semiconductors of greatest importance in electronics are germanium and silicon. These elements are located in the fourth column of the periodic table and have four valence electrons. The crystal structure of germanium or silicon follows a tetrahedral pattern with each atom sharing one outer or valence electron with each of four neighboring atoms. Electrical conduction takes place in a pure semiconductor when the crystal has enough energy (usually from heat) to cause a few valence electrons to break the bonds holding them in the crystal. When a bond is broken a vacancy in the crystal, called a hole, is left. The region in which the vacancy exists has a net positive charge; the region in which the freed electron exists has a net negative charge. In such semiconductors both electrons and holes contribute to electrical conduction. If an electron from another broken bond fills the hole the vacancy appears in a new place and the effect is as if a positive charge has moved to a new location.

Basic to the manufacture of transistors is the fact that electrical conduction can be increased greatly and to a precisely controlled extent by adding small amounts of impurities to a single crystal of semiconductor material. This is known as doping. Doping impurities are generally chosen from either the third column or fifth column in the periodic table and actually replace a silicon atom in the crystal structure or lattice (assuming silicon is being used). When an atom from Group 5 replaces a silicon atom in the crystal lattice, only four of the electrons are needed to complete the crystalline bonds; the remaining electron becomes a free electron available for conduction. The resulting material is called an *n*-type semiconductor because of the presence of negative charge carriers in an electrically neutral crystal. If a small amount of Group 3 atoms are added to otherwise pure silicon, a *p*-type semiconductor material is obtained. For example, when a trivalent atom replaces a silicon atom in the crystal lattice, only three electrons are available to complete bonding to the lattice. If the remaining unfilled bond is filled by an electron from a neighboring atom, a mobile hole is created and there is the possibility of current conduction by the motion of positive charges. Used in this way, an atom from Group 3 is called an acceptor atom because it accepts electrons. By adding donor or acceptor atoms in small amounts, the conductivity of a semiconductor can be increased enormously.

A MOSFET may have a substrate made from *n*-type semiconductor material and two regions are built into it that are *p*-type material and are known by convention as the source and drain. Covering the top of the semiconductor is a layer of protective material which would be silicon dioxide if silicon semiconductor were used. Typically, the *p*-type silicon regions are made by diffusing a *p*-type impurity into the *n*-type silicon substrate through windows etched in the silicon dioxide.

The silicon dioxide performs at least two basic functions. First, as just stated it is used as a mask through which *p*-type impurities are diffused into the substrate in specified regions. It is used to protect the silicon substrate from contamination and its insulation properties are used to electrically isolate parts of the electrode from the silicon. Metallic contacts, called electrodes, are deposited over the exposed silicon area in the source and drain. The gate electrode is a metallic conductor deposited over the oxide between the source and drain and separated from the source, drain, and substrate by the oxide.

The operation of a MOSFET is as follows. If there is a voltage differential between the source electrode and drain electrode, electric current would flow therebetween if there were a conductive path. But with the gate voltage at zero volts, the two *p*-regions of the transistor remain isolated from each other and prevent the flow of electric current therebetween.

Conduction in a MOSFET occurs if electrons are able to flow through the source electrode into a *p*-region beneath the source electrode and along a *p*-channel existing between the source *p*-region and the drain *p*-region. Finally, the electrons are able to flow out through the drain electrode. When the gate voltage is at zero, there is no conduction. However, as a negative voltage is applied to the gate, electric field is set up between the gate and substrate which repels electrons away from the surface of the substrate beneath the gate. As the gate voltage becomes increasingly negative, a *p*-type channel of electron-scarce silicon is created immediately beneath the oxide layer extending between the two *p*-regions. This is known as inversion. The *p*-channel provides a path for the conduction of charge carriers between the source and drain such that with a negative voltage on the drain and the source at ground, or vice versa, a current will flow through the *p*-channel.

Before the surface can be inverted to form a *p*-channel, the gate voltage must reach a certain critical level called the threshold voltage, $V_t$, which physically is the voltage necessary to repel a sufficient number of electrons away from the surface to neutralize the surface charges. The value of $V_t$ depends on the quality of the process by which the transistors are made and is presently in the range of minus 2 to minus 5 volts. As the gate voltage, $V_G$, becomes more negative than $V_t$, the channel depth, and hence the conduction path, increases. By varying the gate voltage, it is possible to modulate the size of the channel and thereby control the amount of current flowing in either direction through the transistor. This mode of operation makes the FET unique in that current flows equally well in either direction. The resistance to current flow presented by the *p*-channel is called the on resistance of the transistor and is very small when compared to the resistance of the transistor with no signal on the gate, called the off resistance. For example, the off resistance may be several million ohms whereas the on resistance may typically be between 500 and 5,000 ohms.

The MOSFET described above is known as a *p*-channel enhancement mode device because a *p*-type channel is induced, that is enhanced, by the application of voltage to the gate. If a channel exists at $V_G$=0, the device is known as a depletion mode device. Other types of MOSFET's operate in a *p*-channel depletion mode, *n*-channel enhancement mode, and *n*-channel depletion mode. The present invention applies equally well to all of the above devices.

In circuit applications, the FET is used in much the same way as vacuum tubes or conventional bipolar transistors. For example, in communications applications they are often used as amplifiers, whereas in digital applications they are often used as switches. Because vacuum tubes and bipolar transistors came into popular use well before FET's, they, particularly the bipolar transistors, are presently used in more applications. However, FET's possess some inherent advantages that will likely enable them to capture a substantial portion of the applications presently handled by bipolar transistors. Some of the advantages of the FET are small size, reduced power dissipation, mechanical ruggedness, and nearly complete isolation of input from output.

With the foregoing background information in mind, there should be little difficulty in appreciating the following detailed description of the invention.

Referring now to FIG. 2, inverter 50 consists of a pair of insulated gate field-effect transistors 52 and 60. Transistor 52 has a gate electrode 54, a drain electrode 56 and a source electrode 58. Likewise transistor 60 has a gate electrode 62, a drain electrode 64 and a source electrode 66.

Electrodes 54, 56 and 64 are connected to a source of clock pulses, $\phi_2$, generally having an internal impedance, $R_\phi$, of 50 ohms or less and capable of generating narrow-width fast-rise time pulses. For example, pulses having a width in the range of 5 to 15 nanoseconds are desirable. The pulse width and cycle time are of course a matter of some choice, but generally the narrower the pulse width the faster the cycle time and the faster the general operation of the circuit.

In the case of *p*-channel enhancement mode devices, the clock pulses swing from a ground level to a negative amplitude of the order of four to five times the threshold voltage of the device (threshold voltages are in the neighborhood of 2 to 5 volts). The data pulses swing from a ground to a negative amplitude of the order of two to three times the threshold voltage of the device. For digital applications, ground level is defined as a logic 0 and a negative voltage level is defined as a logic 1. Source electrodes 58 and 66 are interconnected and tied through lead 68 to interconnected drains 70 and 72 of transistors 74 and 76, respectively. Transistors 74 and 76 perform the isolation function as hereinbefore defined. That is for a certain portion of the circuit's cycle time, transistors 74 and 76 are nonconducting and thereby isolate inputs Y and Y' from the remainder of the circuit. Thus connected to one side of transistors 74 and 76 are the input lines Y and Y'; and connected to the other side are leads 78 and 80 that make connection with the remainder of the circuit. Connected between lines 78 and 80 is the series combination of transistors 82 and 84 respectively having gates 86 and 88. The common mode between transistors 82 and 84 is grounded. Gates 86 and 88 are connected to a source of clock pulses $\phi_1$.

Clock pulses, $\phi_1$, originate from a source of pulses substantially similar to that of clock pulse $\phi_2$. The distinct phase relationships necessary for the operation of this circuit will be discussed in detail in connection with FIG. 3.

Transistors 82 and 84 are part of the initializing circuitry as hereinbefore described and during part of the cycle time operate to ground lines 78 and 80.

Also connected across lines 78 and 80 are cross-coupled transistors 90 and 92 respectively having gates 94 and 96. The sources of transistors 90 and 92 are connected in common to ground through lead 98. Transistors 90 and 92 are part of the converter circuitry and should have matched parameters.

A third source of clock pulses, $\phi_3$ is supplied by lead 100 to gates 102 and 104 of transistors 106 and 108, respectively. The source and drain of transistor 106 are connected in parallel between leads 100 and 78. Whereas transistor 108 is serially connected between lead 78 and the input to inverter 110. The source of clock pulses $\phi_3$ is substantially the same as that for $\phi_2$ and $\phi_1$.

Inverter 110 consists of transistors 112 and 120. Transistor 112 has a gate 114 and transistor 120 has a gate 116. The drains of transistors 112 and 120 are interconnected at point 122 and tied to a source of clock pulses $\phi_1$. The sources of transistors 112 and 120 are interconnected at point 124 and from there go through output transistor 126 to output terminal 128. Gate 127 of transistor 126 is connected to a source of signal pulses $\phi_4$. When a signal pulse is present at gate 127, the output of the entire circuit is gated to outside circuitry.

Transistor 130 is connected in series between gate 116 and ground. Gate 132 of transistor 130 is connected to a source of clock pulses $\phi_1$. Transistor 130 is part of the initializing circuitry and operates to ground gate 116 during a certain portion of the circuit cycle time.

OPERATION OF THE INVENTION

In the following discussion please refer to FIGS. 2 and 3. Inverter circuit 50 serves the basic function of disconnecting the Y and Y' lines from the remainder of the circuit during the first half of the overall cycle time. The overall cycle time could be determined with respect to either $\phi_1$, $\phi_2$ or $\phi_3$; however, arbitrarily $t_0$ has been established as the leading edge of $\phi_1$. The operation of inverter 50, however, is best understood by considering its operation to commence at time $t_2$ at which time transistor 52 is turned on and a negative signal is supplied therethrough to the gate terminals 70 and 72 of transistors 74 and 76, respectively. When $\phi_2$ returns to ground at time $t_3$, the negative charge that is stored on the capacitance associated with gates 70 and 72 will be isolated thereon until time $t_4$. At time $t_4$, the leading edge of $\phi_1$ will turn on transistor 60 and discharge gates 70 and 72 to the clock ground. Thus transistors 74 and 76 will be turned of from the leading edge of $\phi_1$ to the leading edge of $\phi_2$, or from time $t_4$ to time $t_6$ and cyclically thereafter. For a more detailed discussion of the operation of inverter 50, refer to the copending application Ser. No. 787,067, filed Dec. 26, 1968 in the name of A. O. Christensen and entitled "Transistor Inverter Circuit."

During the time that transistors 74 and 76 are nonconducting, the remainder of the circuit is initialized by connecting critical portions thereof to ground. The initializing mechanism takes place through transistors 82, 84 and 130. Transistors 82 and 84 have a common source that is grounded and common gates that are connected to $\phi_1$. During $\phi_1$ a large negative potential appears at gates 86 and 88 and transistors 82 and 84 are thereby turned on. This procedure effectively grounds lines 78 and 80. Also during time $\phi_1$, transistor 130 is turned on and gate 116 of inverter 110 is grounded therethrough.

After the initializing period, the circuit works in the following manner. At time $t_2$, clock pulse $\phi_2$ goes negative and turns on transistors 74 and 76. At this point in time looking into the terminals of Y and Y', there will be two matched RC circuits. The resistances will consist of the on resistance of transistors 74 and 76 and the capacitances will be those associated with the gates 94 and 96 of devices 90 and 92 and lines 78 and 80. Since the RC time constants on both the Y and Y' lines are the same, the amount of time it will take to charge up the capacitance on gates 94 and 96 will depend upon the voltages applied to the Y and Y' lines. In the case of a dual-rail memory cell (as described in copending application Ser. No. 821,755, filed May 6, 1969 in the name of A. O. Christensen) there will be a difference in voltage applied to the Y and Y' lines.

Figure 4:
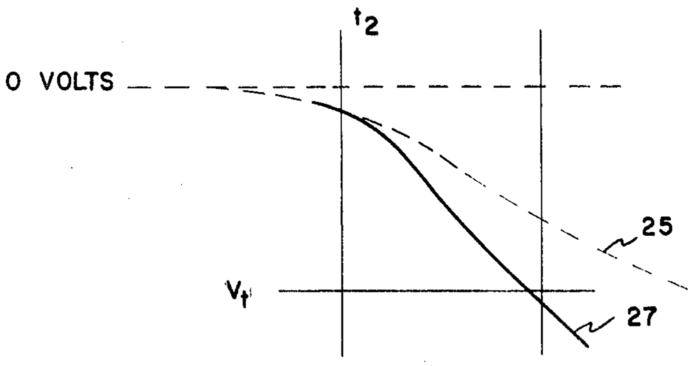
FIG. 4 is a time versus voltage graph that shows the relative discharge rates for two devices in FIG. 2.

Assuming that the voltage on the Y line is more negative than the voltage on the Y' line by one volt or more, the capacitance on gate 96 will charge more rapidly than the capacitance on gate 94. This phenomenon is illustrated in FIG. 4 where the solid line indicates the voltage on gate 96 as a function of time and the dotted line represents the voltage on gate 94 as a function of time. Both gates 94 and 96 start at 0 volts at time $t_2$. However, since the Y line is driven by a greater voltage, gate 96 will reach $V_t$ more quickly than gate 94. Thus transistor 92 will turn on before gate 94 reaches $V_t$, and with transistor 92 conducting, line 80 and gate 94 are connected to ground via lead 98. Transistor 90 will not be turned on.

At this point in the operation of the circuit, the input line closest to ground has been completely discharged and is essentially at ground potential.

To further distinguish between the two input lines, the input line that was initially furthest removed from ground (in this case in a negative direction) will now be further removed from ground potential. To accomplish this object, transistors 106 and 108 are turned on at time $t_3$ by the leading edge of clock pulse $\phi_3$. After the leading edge of clock pulse $\phi_3$ has turned on transistors 106 and 108, the remainder of the $\phi_3$ clock pulse passes through transistor 106 and 108. The 1 signal coming in on the Y line, is relatively small and is amplified in effect when transistor 106 is turned on and the $\phi_3$ pulse thereby appears on line 78. Also at time $t_3$, transistor 108 which had previously isolated the remainder of the circuit from the output inverter 110 is turned on.

Inverter 110 operates in precisely the same manner as inverter 50 except that discharge through transistor 120 is controlled by the signal on gate 116 rather than clock pulse $\phi_1$. At time $\phi_1$ line 125 is charged to a negative voltage through transistor 112. When $\phi_1$ returns to ground, the large negative voltage is isolated on line 125. If a negative voltage is applied to gate 116 at time $t_3$, transistor 120 is turned on and line 125 is discharged therethrough. Since transistor 126 is turned on at time $t_3$, the signal level on line 125 is transmitted to output terminal 128.

Assume now that the Y' line receives the signal furthest removed from ground; that is that the Y' line represents the logical 1 and the Y line represents the logical 0. In this case since the Y' line will be driven by the greatest voltage, transistor 90 will be turned on before transistor 92. When transistor 90 is turned on and conducting, the charge on the Y line or line 78 will be discharged to ground through transistor 90 and line 98. At time $t_3$, clock pulse $\phi_3$ will appear on line 78 but will be dissipated through device 90 to ground. At the same time transistor 108 is turned on and in effect a ground potential is transferred through to gate 116. With a 0 voltage on gate 116, inverter 110 will not discharge the signal on line 125 and strong negative pulse will be supplied to output 128.

In order for the circuit to work properly, the on resistances of transistors 90 and 106 must be carefully controlled. At time $t_3$, both transistor 90 and 106 are conducting and the clock pulse $\phi_3$ is passing through both. Thus these transistors form a voltage divider between line 100 and ground. These transistors are designed such that the conductance of transistor 90 is approximately 10 greater than the conductance of transistor 106. Thus 90 percent of the $\phi_3$ voltage will be dissipated across transistor 106 and line 78 will thereby be maintained close to ground potential.

Figure 5:
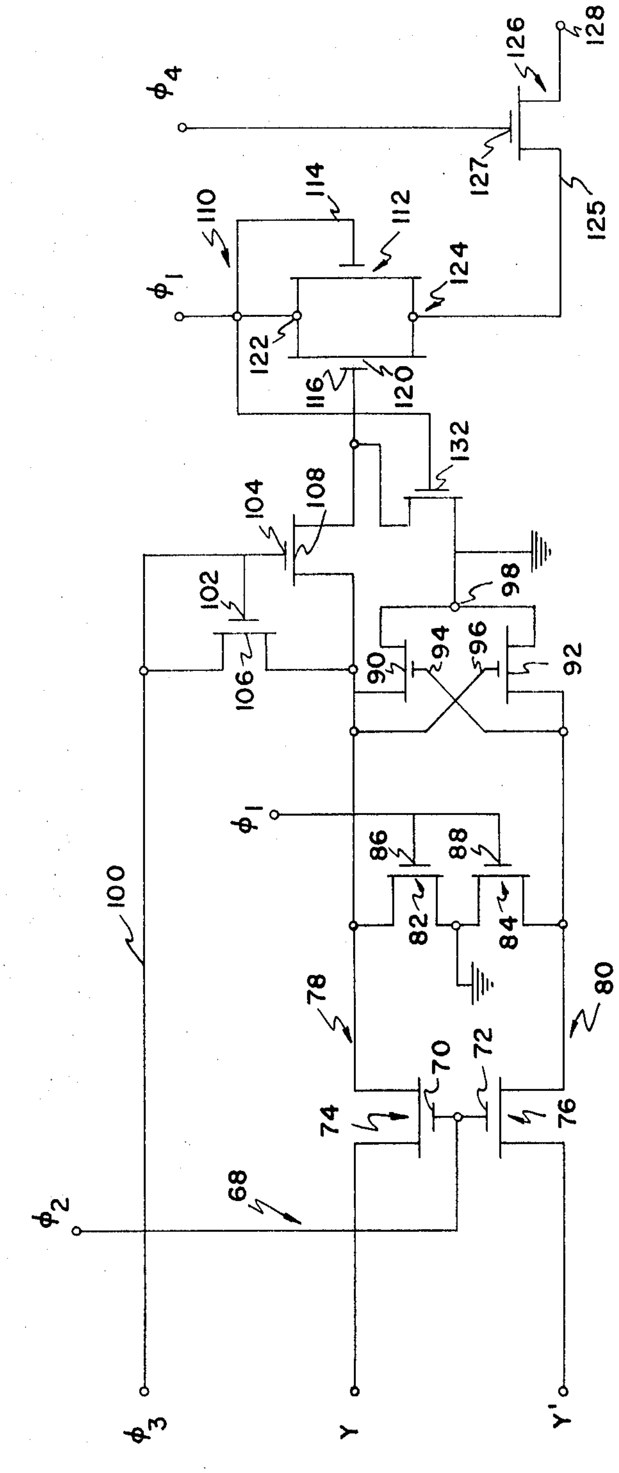
FIG. 5 is a detailed schematic diagram of an alternative embodiment of the invention wherein one inverter circuit may be eliminated.

FIG. 5 illustrates an alternative embodiment of the invention and is in all respects the same as the embodiment of FIG. 2 except that the inverter circuit consisting of transistors 52 and 60 have been removed and line 68 is driven directly from $\phi_2$. In FIG. 3, the waveforms would be the same except that the waveform labeled "Output of Inverter 10" does not apply and instead gates 70 and 72 receive the waveform labeled $\phi_2$ In operation, the difference is that transistors 74 and 76 are opened a smaller portion the circuit cycle time. The advantages of this configuration are the elimination of two transistors.

Figure 6:
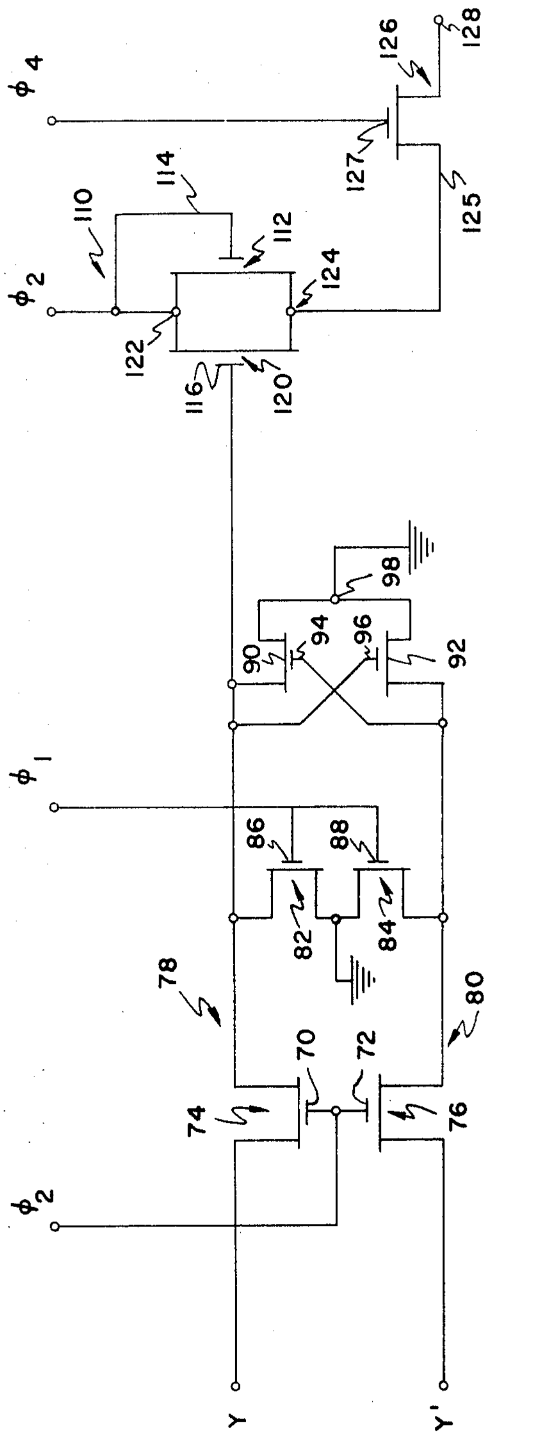
FIG. 6 illustrates an alternative embodiment of the invention for large input signals.

A further embodiment of the present invention is illustrated in FIG. 6. This embodiment takes advantage of the fact that if the input signals, Y and Y', levels are in excess of 8.5 volts ± 0.5 volts, gate 116 of transistor 120 may be driven directly. There would be no need to boost the signal level on line 78. Thus transistors 106, 108 and 130 may be eliminated. Transistor 130 may be eliminated because the initializing of gate 116 can be done via transistor 82 since transistor 108, which had heretofore isolated gate 116 from transistor 82, is now eliminated. Furthermore the output inverter 110 may be driven by $\phi_2$ rather than $\phi_1$.

Figure 7:
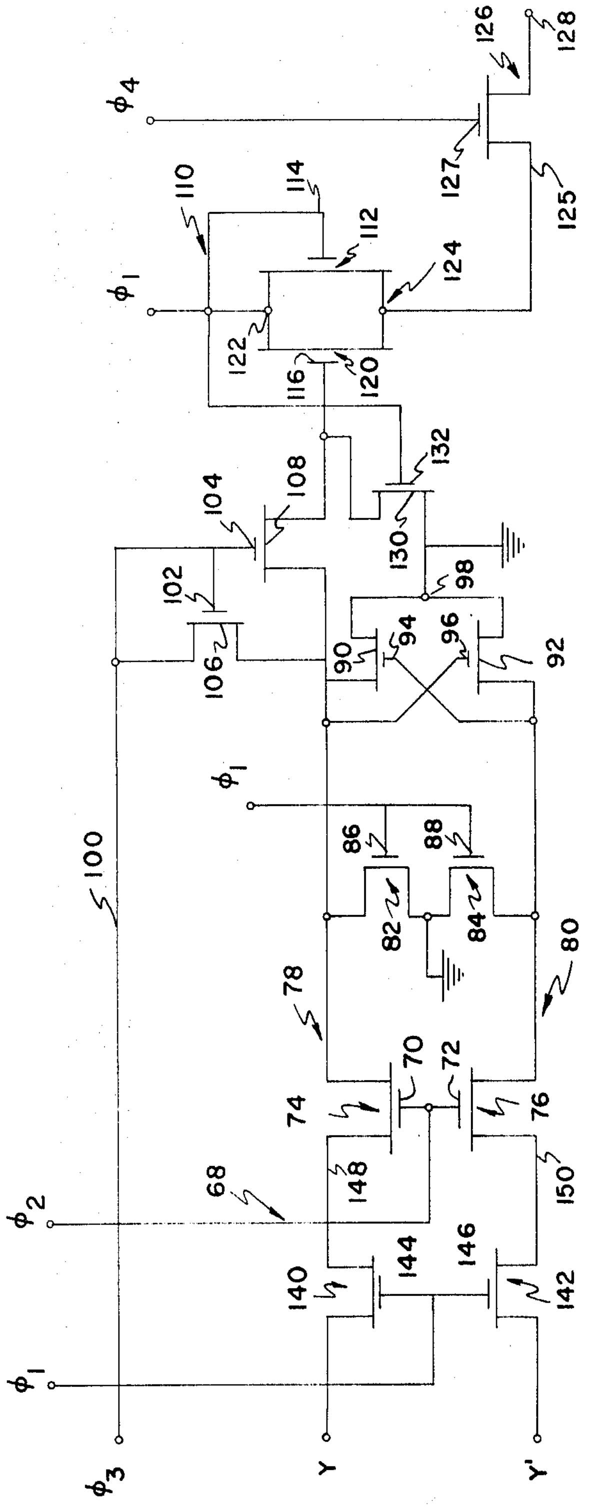
FIG. 7 illustrates an alternative embodiment of the invention wherein the input impedance of the circuit is substantially increased.

FIG. 7 illustrates an embodiment of the present invention wherein the input impedance of the circuit is substantially increased. It sometimes happens that continuous high input impedance is desirable. In the previous embodiments of the invention, the input impedance of the circuit is high except during the time that transistors 74 and 76 are on at which time there is a direct connection between either Y or Y' and ground. Thus for a portion of the overall circuit cycle time, the input impedance of these embodiments is very low. However, this problem may be eliminated by connecting a series transistor 140 between the Y input and transistor 74 and inserting series resistor 142 between the Y' input and transistor 76. Gates 144 and 146 respectively of transistors 140 and 142 are tied together and connected to a $\phi_1$ source of clock pulses. In all other respects the circuit is identical with that as illustrated in FIG. 5. In operation, transistors 140 and 142 gate the signals from the Y and Y' line into the capacitance associated with lines 148 and 150. During this time transistors 74 and 76 remain nonconducting and thus present a very high impedance to the Y and Y' lines. During $\phi_2$ time, transistors 74 and 76 gate the signals held on lines 148 and 150 to the remainder of the circuit. However, during this time transistors 140 and 142 are nonconducting. Thus a very high input impedance is maintained throughout the entire circuit cycle.

I claim:

1. A differential circuit comprising:
- converter means having a first input terminal, a second input terminal, an output terminal, and a gating terminal, said converter means being adapted to detect a difference in voltage on said first and said second input terminals and convert said difference to a pulse on said output terminal when said first input terminal is closer to ground potential than said second input terminal, said converter being operative when a signal is present on said gating terminal;
- input means operatively connected to the input of said converter means, said input means having two input terminals and two output terminals, said input means being adapted to electrically disconnect said input terminals from said output terminals cyclically for a certain predetermined period of time;
- initializing means connected to said converter means, said initializing means being adapted to ground said input and said output terminals of said converter means cyclically for a certain predetermined period of time; and,
- output means connected to said output of said converter means.

2. The circuit of claim 1 wherein said output means comprises the series combination of an inverter circuit and a gate, said inverter circuit being connected to the output of said converter means.

3. The circuit of claim 1 wherein said converter means comprises:
- a pair of cross-coupled transistors connected between said first and said second input terminal, said cross-coupled transistors having one common terminal grounded;
- a source of clock pulses connected through a serial gate to one of said input terminals, said transistor being adapted to turn on and pass said pulse to said input line on a cyclical basis.

4. The circuit of claim 1 wherein said input means comprises:
- a first and second transistor, said first and second transistors being serially connected one to each of said input lines, said transistors having common gates; and,
- a first source of timing pulses connected to said common gates, said timing pulses being adapted to turn on said first and said second transistor cyclically.

5. The circuit of claim 1 wherein said initializing means comprises:
- a pair of serially connected transistors connected between said first input and said second input lines of said converter means, said serially connected transistors having a common grounded electrode and common gates connected to a source of timing pulses, said timing pulses being adapted to cyclically turn on said transistors; and,
- a transistor, said transistor having one electrode connected to the output of said converter means and the other electrode grounded and a gate electrode connected to a source of timing pulses, said timing pulses being adapted to cyclically turn on said transistor.

6. The circuit of claim 4 wherein said input means is further characterized by:
- a third and a fourth transistor, said third and fourth transistors being serially connected one to each of said first and second transistor, said third and fourth transistors having common gates; and a second source of timing pulses connected to said common gates of said third and fourth transistors and adapted to turn on said third and fourth transistors cyclically, said second source of timing pulses having a phase relationship with said first source of timing pulses such that said first and second transistors are in a conducting mode only when said third and fourth transistors are nonconducting.

7. The circuit of claim 1 wherein said output means comprises an amplifier circuit.